United States Patent
Ree et al.

(10) Patent No.: US 11,765,167 B2
(45) Date of Patent: *Sep. 19, 2023

(54) SYSTEM AND METHOD FOR SECURE ONBOARDING OF NETWORK DEVICES

(71) Applicant: ioXt, LLC, Newport Beach, CA (US)

(72) Inventors: Bradley Richard Ree, Oceanside, CA (US); Gary Bernard Jabara, Newport Beach, CA (US)

(73) Assignee: ioXt, LLC, Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/728,706

(22) Filed: Apr. 25, 2022

(65) Prior Publication Data

US 2022/0247744 A1 Aug. 4, 2022

Related U.S. Application Data

(63) Continuation of application No. 16/593,858, filed on Oct. 4, 2019, now Pat. No. 11,316,852.

(60) Provisional application No. 62/741,462, filed on Oct. 4, 2018.

(51) Int. Cl.
*H04L 9/40* (2022.01)
*H04L 9/32* (2006.01)
*H04L 9/00* (2022.01)

(52) U.S. Cl.
CPC ........ *H04L 63/0876* (2013.01); *H04L 9/3268* (2013.01); *H04L 63/0823* (2013.01); *H04L 63/101* (2013.01); *H04L 63/102* (2013.01); *H04L 9/50* (2022.05)

(58) Field of Classification Search
USPC .......................................................... 726/7
See application file for complete search history.

(56) References Cited

U.S. PATENT DOCUMENTS

| 7,574,202 B1 * | 8/2009 | Tsao ...................... H04W 12/64 |
| | | 455/435.2 |
| 11,004,072 B2 * | 5/2021 | Georgiadis .............. H04L 63/08 |
| 2017/0339563 A1 * | 11/2017 | Singleton, IV ......... H04W 4/80 |

* cited by examiner

*Primary Examiner* — Brandon Hoffman
(74) *Attorney, Agent, or Firm* — Davis Wright Tremaine LLP; Michael J. Donohue

(57) ABSTRACT

A secure mechanism for adding network devices uses an unsecure guest network and a secure network both coupled to a secure hub. When an unknown device is introduced, it is initially connected to the guest network and can only communicate with the hub and with a wide area network (WAN). The unknown device is prohibited from communicating with the secure network and any device connected to the secure network. The unknown device provides credentials to the hub, which are verified with a secure database, such as a blockchain ledger, that provides manufacturer device information and certification. Upon authentication, the hub permits the identified device to connect to the secure network. The hub may also configure the now identified device for security and operational parameters. The hub may also retrieve network traffic pattern information from the secure database and use such information to monitor normal expected activity from the identified device.

15 Claims, 8 Drawing Sheets

| | | | | |
|---|---|---|---|---|
| CLOUD | REMOTE ACCESS THOUGH CELLULAR NETWORK | CLOUD TO CLOUD ACL | | |
| ON PREMISE | NETWORK MONITORING IN HUB | AUTOMATIC FW UPDATE OF DEVICES | | |
| | ioXt DEVICE ENFORCED ACL | HUB ENFORCED ACL | | |
| | GROUP END TO END KEY | PRE LINK END TO END KEY | HUB MANAGED KEY ROTATION | |
| | HUB IS THE TRUST ANCHOR ON PREM. | NETWORK OPERATIONAL CERT. | NON-ioXt NETWORK SEGMENTATION | |
| | TWO-FACTOR NETWORK INCLUSION | MULTI-PARTY VOTING INCLUSION | | |
| DEVICE MANUFACTURER | MANUFACTURE AND MODEL VERIFICATION | ioXt CONFORMANCE VERIFICATION | OUT OF BAND DEVICE JOIN KEY | DEVICE AUTHENTICITY |
| | BLOCKCHAIN MODEL REGISTRATION | BLOCKCHAIN PROTOCOL CERTIFICATION | EXPECTED TRAFFIC PATTERN | |
| | SIGNED IMAGE | OTA UPDATE | ANTI ROLLBACK | DISABLED DEBUG PORTS | QR INSTALL CODE |
| | MANUFACTURER CERT. | MODEL CERT. | DEVICE CERT. | | NETWORK HEALTH INDICATORS |
| | ioXt PKI | BLOCKCHAIN PKI | | | HUB MANAGEMENT INTERFACE |

FIG. 9

SYSTEM AND METHOD FOR SECURE
ONBOARDING OF NETWORK DEVICES

This application is a continuation of U.S. patent application Ser. No. 16/593,858, filed Oct. 4, 2019, now U.S. Pat. No. 11,316,852, entitled "SYSTEM AND METHOD FOR SECURE ONBOARDING OF NETWORK DEVICES," which claims the benefit of U.S. Provisional Application No. 62/741,462, filed Oct. 4, 2018, entitled "SYSTEM AND METHOD FOR SECURE ONBOARDING OF NETWORK DEVICES," the content of which are incorporated by reference herein in their entirety.

BACKGROUND OF THE INVENTION

Field of the Invention

The present disclosure relates generally to network devices and, more particularly, to a system and method for the secure introduction of new devices to a network.

Description of the Related Art

Smart networks, including home networks, have traditionally relied upon an administrator who was knowledgeable about what devices they were adding to their network. Further, it is assumed that all devices on the network are fully trusted to behave on the network. For operators who wish to control the devices being connected on the network, they are forced to be an active party during the addition of any new device onto the network. This is accomplished through a professional installer, or a customer call to an operator call center that then enables the "join" process and monitors the device being added. If an invalid device enters the network, the operator will then send a network leave command to the device. In many instances, a bad acting device (e.g., an infected or compromised device) could ignore the network leave command and thus a network key rotation may also be required.

Accordingly, there is a significant need for techniques to securely add network devices. The present disclosure provides this and other advantages as will be apparent from the following details description and accompanying figures.

BRIEF DESCRIPTION OF THE SEVERAL VIEWS OF THE DRAWING(S)

FIG. 9 illustrates an ioXt security model.

DETAILED DESCRIPTION OF THE INVENTION

Figure 1:
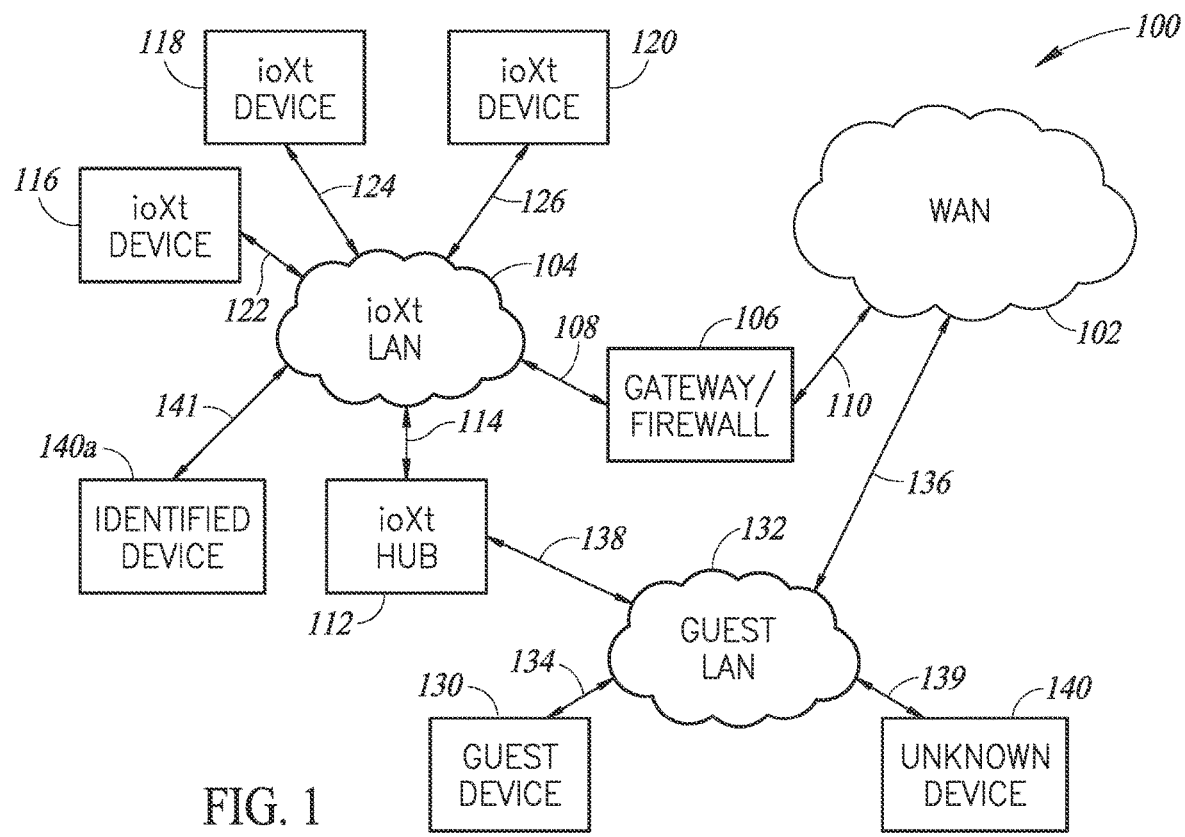
FIG. 1 illustrates a typical network architecture configured in accordance with the present disclosure.

FIG. 1 is a diagram of an exemplary architecture of a system 100 constructed in accordance with the present disclosure. The system 100 includes a wide area network (WAN) 102 and a secure local area network (LAN), designated herein as an ioXt network 104, to indicate that the LAN is a secure network configured in accordance with the present disclosure.

The ioXt network 104 is connected to the WAN 102 via a gateway/firewall 106. The ioXt network 104 is connected to the gateway/firewall 106 with a communication link 108 while the gateway/firewall is connected to the WAN 102 via a communication link 110.

An ioXt hub 112 is coupled to the ioXt network 104 via a communication link 114. FIG. 1 also illustrates ioXt devices 116-120, which are coupled to the ioXt network 104 via respective communication links 122-126.

FIG. 1 also illustrates a guest device 130 coupled to an unsecure guest LAN, referred to herein as a Guest network 132, via a communication link 134. A "guest device" is defined herein as an internet connected device that is not designed in accordance with ioXt security standards. For example, legacy devices that do not have the inherent ioXt security features may be connected to the Guest network 132. As will be described in greater detail below, a guest device (e.g., the guest device 130) is allowed to communicate only with the WAN 102 or the ioXt hub 112. The guest device 130 is prohibited from communicating with any ioXt devices (e.g., the ioXt devices 116-120) or the ioXt network 104.

The Guest network 132 is connected to the WAN 102 via a communication link 136. A gateway/firewall (not shown) may also be implemented between the guest LAN 132 and the WAN 102. The Guest network 132 also communicates with the ioXt hub 112 via a communication link 138.

The present disclosure describes techniques by which an unidentified device 140 connects to the ioXt hub 112 with at least two LAN networks: the Guest network 132 and the ioXt secure LAN 104. The Guest network 132 is treated as an unsecured network, while the ioXt network 104 is a secure and trusted network. As noted above with respect to FIG. 1, the Guest network 132 will only allow devices to talk to the WAN 102 interface and the ioXt network manager (typically located in the hub 112). The ioXt network 104 allows ioXt devices 116-120 to communicate with the WAN 102, and other devices on the ioXt network 104 (based on the firewall rules for the ioXt network).

The process of connecting a new device to a secure network (i.e., the ioXt network 104) will be described in greater detail below. Initially, the unknown device 140 is connected to the Guest network 132 via a communication link 139. Following authentication, the now identified device, illustrated in FIG. 1 with the reference 140a, is connected to the ioXt network 104 via a communication link 141.

The various communication links described in FIG. 1 (i.e., the communication links 108-110, 114, 122-126, 134-139, and 141) are all conventional communication links that may be implemented using a variety of known technologies. These technologies can include both wired and wireless communication links. For example, the communication links with the ioXt network 104 may be implemented using wired and wireless links. The wireless links can include, but are not limited to, Bluetooth, WiFi, Zigbee, and the like. In another example, communication links to the WAN 102 may be implemented using hardwired connections, optical connections, microwave links, satellite links, and the like. The system 100 is not limited by any particular form of implementation for any of the communication links described herein. In an exemplary embodiment, some or all the communication links to the ioXt network 104 (e.g., the communication links 108, 114, 122-126, and 141) may be secure communication links where data may be encrypted on these links for added security.

The system 100 generates various rules that control which ioXt devices 116 may talk with each other and which may control other device(s). For example, it is never necessary for an ioXt light bulb to communicate with a set-top box. However, it may be necessary for the ioXt light bulb to communicate status information (i.e., on or off) to the hub 112. The access and control rules are stored in a secure fashion within the system 100. In an exemplary embodiment, the rules, as well as authentication/operational certificates, encryption keys, or hashes thereof, may be stored in a distributed ledger, such as a blockchain 142 (see FIG. 3).

Figure 2:
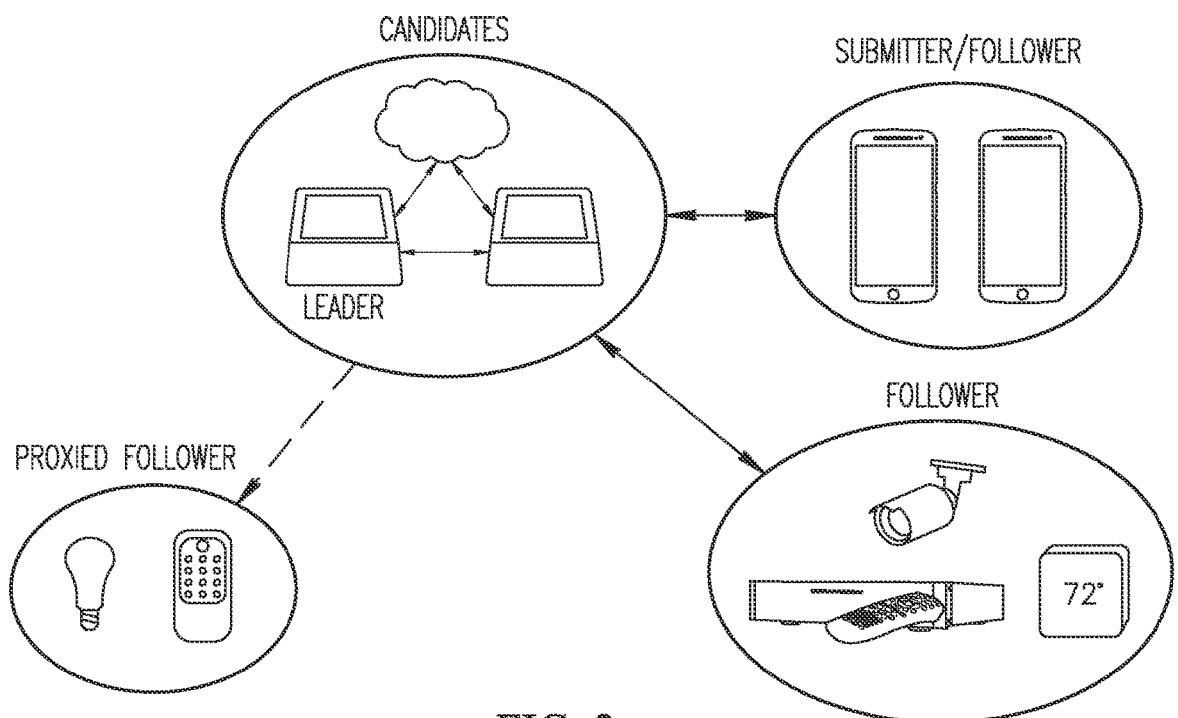
FIG. 2 illustrates the various network components used in the device validation process.

FIG. 2 illustrates the various network components, referred to as "actors," in the present disclosure. In an exemplary embodiment, there are five actors that are part of the system 100: Leader, Candidates, Submitter/Follower, Follower, and Proxied Follower. A Candidate device is one that is considered to be highly trustworthy. For example, a set-top box, router, or modem is typically provided by a service provider (e.g., a cable service provider). As such, the device has security certificates provided by the service provider. This is in contrast to a device from a manufacturer that may be purchased online. It may not be possible to determine how secure a router is if it was purchased online from an unknown source. As such, these types of devices cannot be considered Candidates.

Because it is a trusted device, a Candidate has the authority to set access rules for devices on the ioXt network 104. Multiple Candidates in the example of FIG. 2 can vote on proposed rule changes. For example, a user may wish to change an access rule so that a smart light bulb can be controlled by a video camera. When the video camera detects motion, it can turn on the light bulb. The proposed rule change to permit such control is submitted to the Candidates, which vote on the authorization of such rule change requests. If a majority of the Candidates agree, the rule is changed.

The Leader is elected from the Candidates. There are known protocols for electing a leader. The system described herein uses a version of the RAFT protocol, which is known in the art. The election process includes factors such as available communication links (e.g., Ethernet, cellular, and the like), presence at the location (as opposed to presence at a remote location), and the like.

The Leader is responsible for determining the order of transactions, processing the transactions, tallying votes by the Candidates, updating the ledger (e.g., the ioXt blockchain ledger 142 in FIG. 3), and distributing the ledger. Candidates must be ioXt approved devices and possess an ioXt network operational certificate.

Submitter/Followers are the only approved devices in the system 100 authorized to submit transactions to the Leader. One example of a Submitter/Follower is a mobile communication device with a software application program. The introduction of a new device to the ioXt network 104 is one example of a transaction. The Submitter/Followers must be ioXt approved devices and possess a network operational certificate. They also receive copies of the ledger (e.g., the ioXt blockchain ledger 142 in FIG. 3) as they may be active participants in a message exchange with other nodes on the ioXt network 104. Followers are ioXt devices that use data from the ioXt chain 142 to manage their access control lists, and firewall rules.

Interconnections between Candidates, Followers, and Submitter/Follower are illustrated in FIG. 2 in solid lines to indicate they exchange information, including information in the ioXt chain 142. Copies of the ioXt chain 142 may be stored in any of these devices. In addition, a copy of the ioXt chain 142 may be stored in a secure location on the Cloud, as illustrated in the Candidates block in FIG. 2. The Cloud storage location may also include blockchain data storage for other unrelated ioXt networks. However, one ioXt network cannot access the blockchain data for another ioXt network.

Proxied Followers are devices that are not able to directly use the ioXt chain 142 data and are connected to the ioXt network through a proxy (or bridge). This is illustrated by a dashed line in FIG. 2. The proxy will enforce the access control list between Followers and the Proxied Follower. A Proxied Follower typically does not store a copy of the ioXt chain 142 data. It may store part of the chain data relates to its own operation (e.g., access rules for a light bulb).

It is assumed that the hub 112 is a Candidate as it typically contains the LAN/WAN interface for the ioXt network 104. Further, there may be multiple hubs 112 in the ioXt network 104 as each hub may provide network connectivity to different physical locations or provide different LAN protocols. As each hub 112 is a Candidate, any rules published on the ioXt chain 142 (see FIG. 3) would be distributed to all hubs 112 on the ioXt network 104. Thus, if a particular ioXt device (e.g., the ioXt device 118) roams between hubs 112, the network rules would be enforced across all physical locations.

Figure 3:
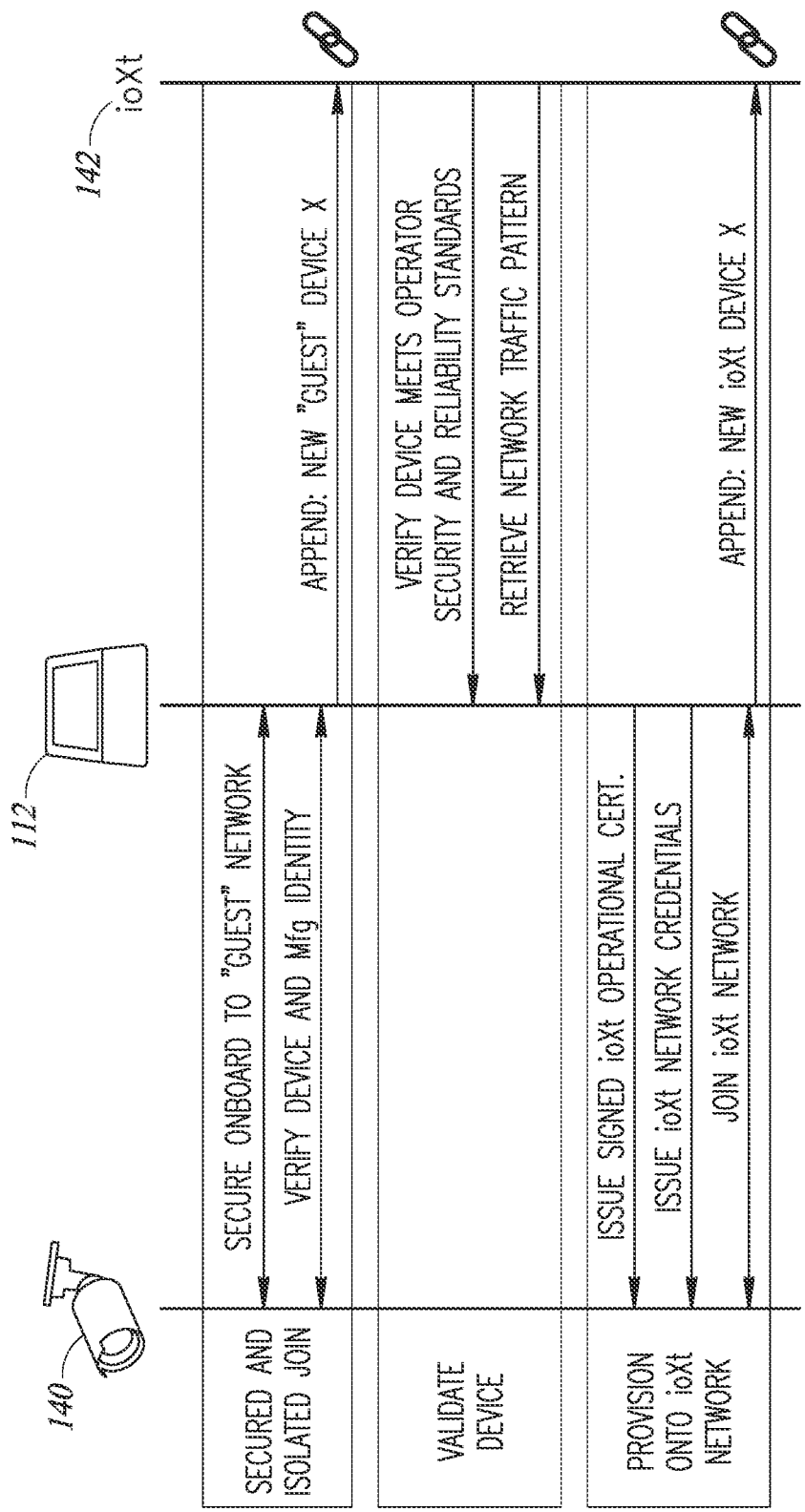
FIG. 3 illustrates a communication exchange for an initial acceptance of a device into the secure network.

FIG. 3 illustrates the initial acceptance of the unidentified new device 140 into the secure ioXt network 104. A user would start the join process. In one example, the unidentified device 140 includes a QR code that the user may capture using a smartphone application. The smartphone is classified as a "Submitter/Follower" and the hub 112 is classified as a "Leader," as discussed above with respect to FIG. 2. The captured QR code causes the "Leader" hub 112 to initiate communications with the unidentified device 140. This communication initially transfers the Guest network credentials (e.g., the Guest network 132) to the unidentified device 140. The unidentified device 140 provides device identity and manufacturer identity to the hub 112. In this example, the unidentified device 140 illustrated herein is a camera shown in the top left of FIG. 3 while the Leader hub 112 is shown in the top center of FIG. 2 and the ioXt chain 142 (e.g., a blockchain) is shown on the right of FIG. 3. Those skilled in the art will appreciate that the same process may be carried out for other network devices.

Once the unidentified device 140 is on the Guest network 132, the hub 112 writes a log entry onto the ioXt chain 142 noting the time, device identity, and the identity of the user who allowed the unidentified device 140 to join. Credentials supplied by the unidentified device 140 are then read (and validated) from the unidentified device. The credentials are verified against a blockchain secured database. This may be the ioXt blockchain 142 for the ioXt network 104 or a centralized ioXt blockchain (e.g., a Cloud-based blockchain, such as illustrated in FIG. 2) that stores device credentials for a number of devices from different manufacturers. The blockchain database may also provide network management information, such as expected network traffic patterns, default device configurations, and acceptable link partners. The device credentials provided by the unidentified device 140 should also include an ioXt signed certificate. The ioXt signed certificate is verified through a TLS style exchange, and then verified that the device and the hub have both been signed by the ioXt root authority. It should be noted that alternative methods of authenticity and ioXt compliance, such as centralized data base or certified products, may be used.

Once the hub 112 determines that the now identified device 140a may join the ioXt network 104, a log entry is added to the ioXt chain 142 noting the acceptance of the now identified device onto the ioXt network 104, as shown in FIG. 1. The hub 112 then issues an ioXt network operational certificate to the identified device 140a. In an exemplary embodiment, the identified device 140a generates a key pair, and then issues a certificate signing request to the hub 112. This technique prevents secret material from being transmitted. The hub 112 then establishes a secure session using the operational certificate and transfers the ioXt network credentials to the identified device 140a. The identified device 140a then leaves the Guest network 132 and joins the ioXt network 104 via the communication link 141. Once joined on the ioXt network 104, a log entry is written onto the ioXt chain 142.

The device identity, traffic pattern restrictions, firewall configurations, and any access control settings are also written onto the ioXt chain 142. If an encryption key is issued to the identified device 140a, a hash of the key would also be written to the ioXt chain 142, which would allow other ioXt devices on the ioXt network 104 to verify that the key stored in the identified device 140a matches the latest key issued by the hub 112.

Figure 4:
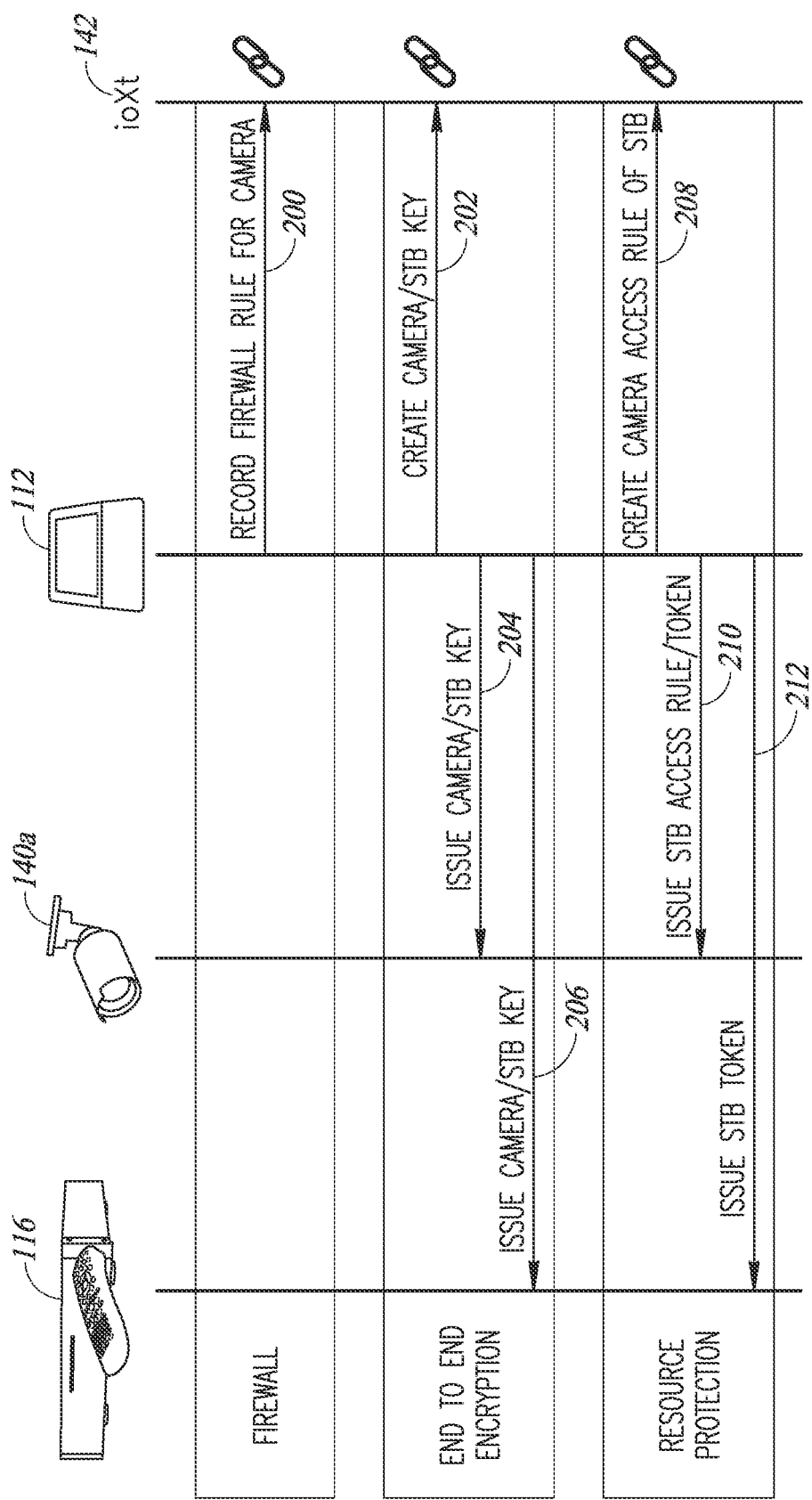
FIG. 4 illustrates a security configuration of the newly authenticated device.

FIG. 4 illustrates the security configuration of the newly authenticated device (e.g., the identified device 140a). In the example of FIG. 4, the identified device 140a is illustrated as a camera, but the principles described herein apply to other types of ioXt devices 116. The ioXt camera 140a is authorized to send the video signal to another ioXt device. In the example of FIG. 4, the camera 140a is authorized to send video signals to a set-top box (STB), which is identified as the ioXt device 116 in the top left portion of FIG. 4.

At step 200, the hub 112 records firewall rules for the ioXt camera 140a with the ioXt chain 142. In step 202, the hub 112 creates a camera/STB key and records it with the ioXt chain 142. The hub 112 then issues the camera/STB key to the ioXt camera 140a in step 204 and issues the camera/STB key to the ioXt STB 116 in step 206. The hub 112 creates camera access rules for the ioXt STB 116 in step 208. In step 210, the hub 112 issues an STB access rule/token to the ioXt camera 140a in step 210. In step 212, the hub 112 issues a STB token to the ioXt STB 116. Thus, using this process, the security configuration for the ioXt camera 140a has been completed to permit the camera to deliver video to the STB in a secure fashion with end-to-end encryption. The various rules and keys have also been logged onto the ioXt chain 142.

ioXt Block

Each block in the ioXt chain 142 contains a block number, either log or device network control data, submitter ID, Leader ID, hash of the previous block, and hash of the current block. Essentially, the ioXt chain 142 maintains both a log and modifications to the network/device access rights such that modifications to sealed blocks would invalidate all following blocks. It should be noted that the log and network/device access rights do not need to be in a single chain, and other information may be added to the block. The ioXt chain 142 is encrypted with the network password. As noted above with respect to FIG. 2, the Candidates, Follower, and Submitter/Follower are nodes on the ioXt network 104 and may receive and store copies of the ioXt chain 142 data. However, no secret material is stored on the ioXt chain 142 as these multiple nodes will receive copies of the chain data. Instead, a hash of the secret data may be stored such that nodes may validate that the secret data being held in the device is still valid.

Over time, the ioXt chain 142 may grow too large to maintain in the nodes. Thus, a Follower (see FIG. 2) may choose to process the ioXt chain 142, and store the current access rights in secure memory within the Follower device. Periodically (or at power up), the Follower device may request a copy of the chain and verify the contents of the secure memory.

In an alternative mechanism to trim the chain, the Leader (e.g., the hub 112 in FIG. 1) can write a fork message into the chain, and then a current snapshot of each device's network access rights would be written onto the ioXt chain 142. The chain segment prior to the fork could be stored in a memory rich device such as the Candidates, but in one embodiment all other nodes on the ioXt network 104 would discard any block prior to the fork block. For example, a Proxied Follower, such as a light bulb, need not store the entire blockchain, but need only store the current set of rules that are relevant to the Proxied device. The device would then update their network access data based on the updated block data, and then continue operation as before the fork.

Figure 5:
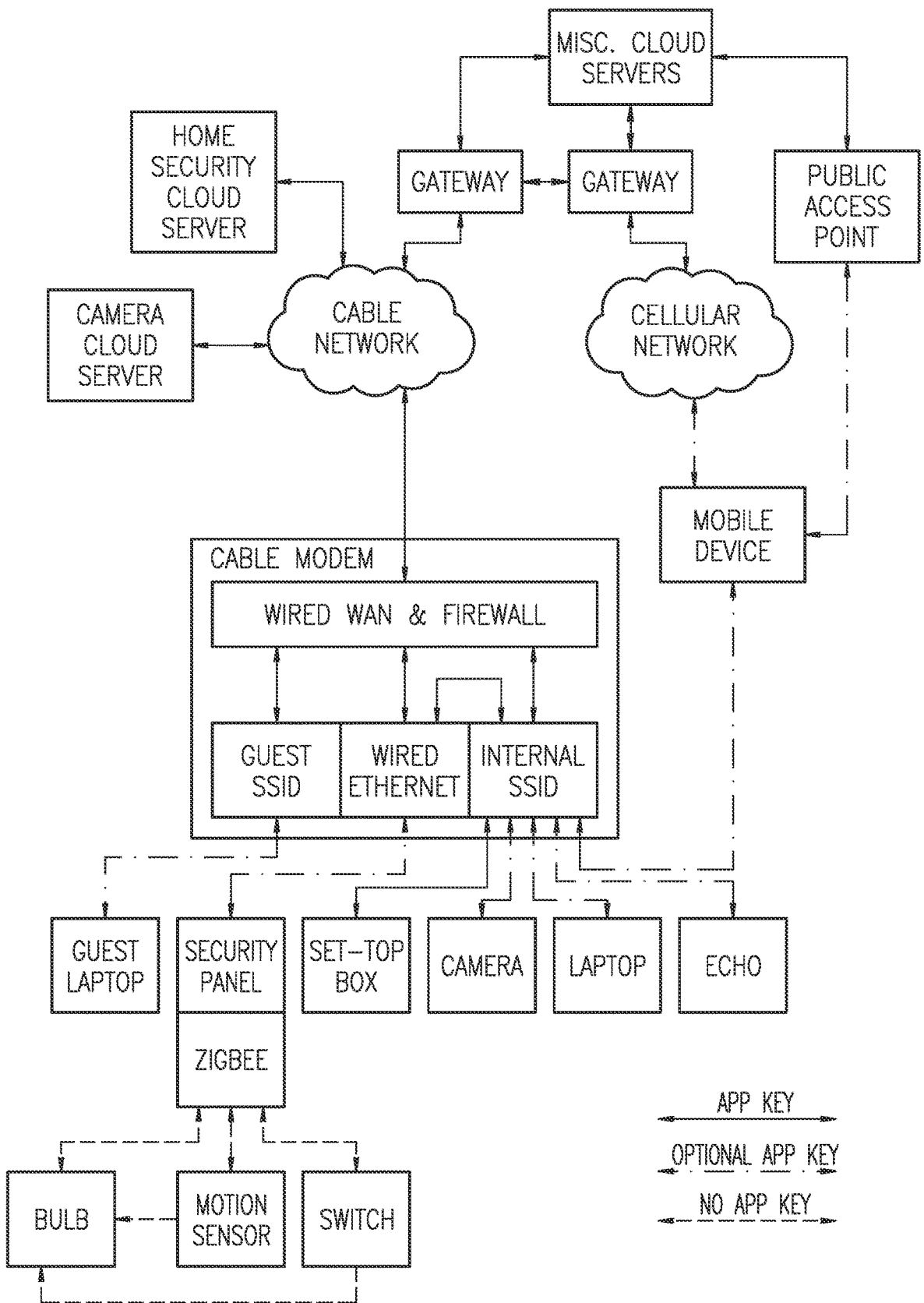
FIG. 5 illustrates a prior art "smart home" implemented with a cable network.

FIG. 5 illustrates a prior art "smart home" implemented with a cable network. It is possible for unsecured devices to connect to the same internal network as security devices thus increasing the chances for intruder penetration into the system. For example, if a new device, such as the set-top box illustrated FIG. 5 is introduced to a home network, it has access and visibility of the entire home network. If the newly introduced device is infected, it can provide an opportunity for an intruder to gain access to the entire home network. Similarly, if an already introduced device becomes infected over time, the same undesirable results may occur.

In FIG. 5, the various network devices are all coupled to the cable modem. This includes, in the example of FIG. 5, a guest laptop, security panel coupled to remote sensors and devices, a set-top box, camera, and laptop computer. FIG. 5 also illustrates a mobile device connected to the cable modem. If any of these devices, such as the mobile device or set-top box, becomes infected, it can gain access to the entire network.

Figure 6:
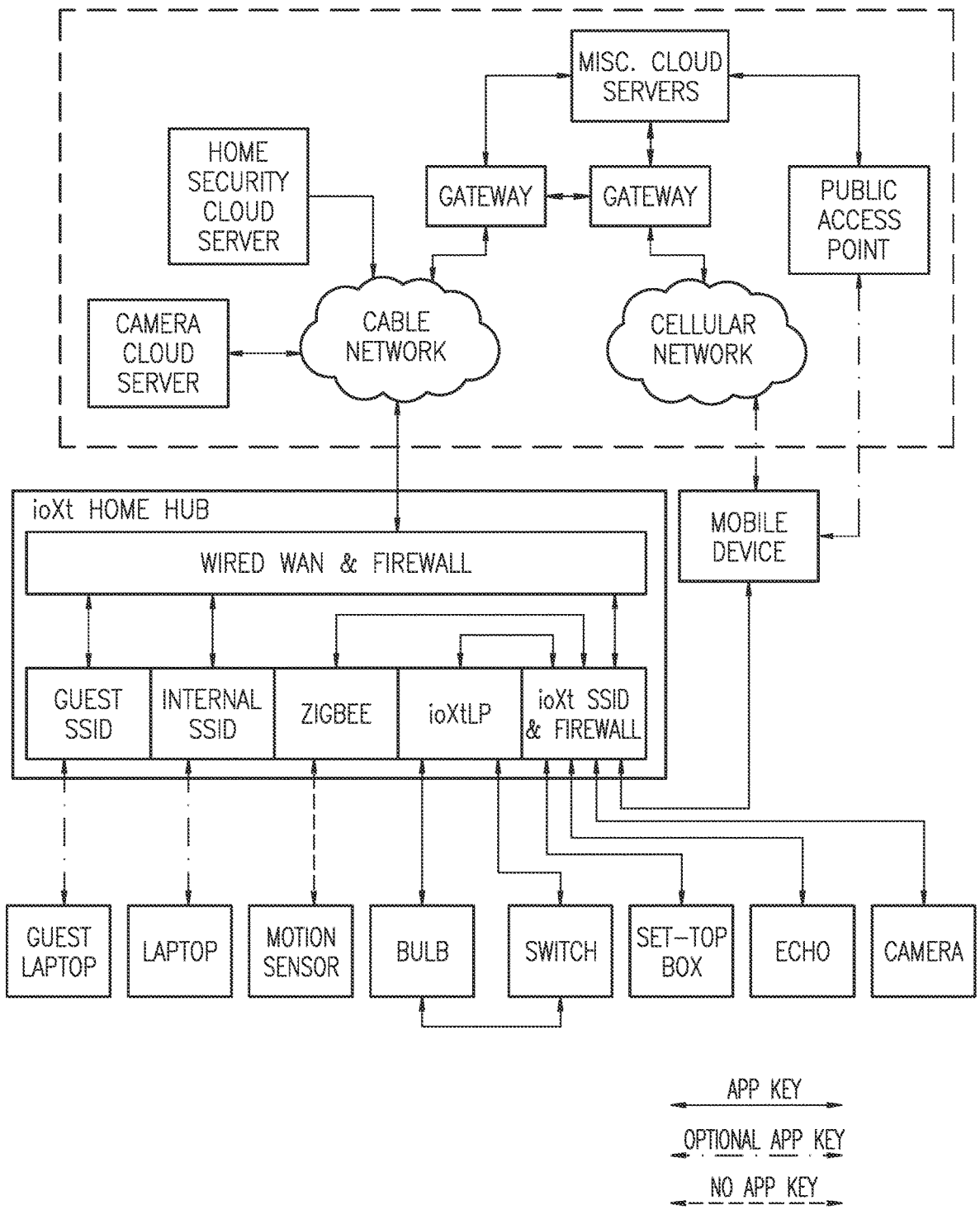
FIG. 6 illustrates a cable network implementation of a home security system configured in accordance with the present disclosure.

FIG. 6 illustrates a home security implementation using the techniques provided by the system 100, such as an ioXt network. As illustrated in FIG. 1, and discussed above, the ioXt system 100 provides an unsecured Guest network (e.g., the Guest network 132) and a secure ioXt network (e.g., the ioXt network 104). For the sake of clarity, the diagram of FIG. 6 does not illustrate the separate Guest network 132 or the ioXt network 104. However, the components connected to the Guest network 132 include, for example, a guest laptop, laptop, and motion sensor.

FIG. 6 illustrates network connections that can have an application key (shown as a solid line between the devices and the hub), an optional application key (shown as a dot-dash line between the devices and the hub), and no application key (shown as a dashed line between the devices and the hub). As those skilled in the art will appreciate, almost all wireless networks include a unique network key. For example, every home WiFi network has a common key.

Thus, every device on the network can talk to each other. Wireless device networks, such as Zigbee, are exactly the same.

Some networks, such as Zigbee or Z-Wave, only have a network key and do not support application layer keys. The motion sensor in FIG. 6, for example, is connected to the Zigbee network with no application key, illustrated in FIG. 6 with a dashed line. Thus, anyone on the network can see the traffic. In other words, a network in which a bad actor gets on the network, or a good actor gets hacked and becomes a bad actor, the bad actor will be able to intercept all the traffic between two other nodes on the network.

However, on some networks, an application layer key can be used to secure the connection between two devices. For example, on a WiFi network, HTTPs is a secure connection between the computer and web server. This optional application key is illustrated in FIG. 6 with dash-dot lines.

The remaining devices coupled to the hub include, in the example of FIG. 6, a bulb, switch, set-top box, and camera. These devices are coupled to the ioXt network 104 (see FIG. 1). The ioXt devices (e.g., the ioXt devices 116-120 in FIG. 1) are connected to the hub through secure communication links having an application key illustrated in FIG. 6 by solid lines. In addition, FIG. 6 illustrates some components, such as the bulb and switch, connected to an ioXt low power (LP) interface while other components are coupled to an ioXt interface and firewall.

Certain devices, such as a guest laptop can connect with the Guest network 132 (see FIG. 1) and gain internet access via the hub, but never connect to the ioXt network 104 and cannot communicate with the ioXt network 104 or ioXt devices (e.g., the ioXt devices 116-120 illustrated in FIG. 1) coupled to the ioXt network. FIG. 6 illustrates a Home Hub firewall as part of the WAN 102 interface.

FIG. 6 also illustrates an ioXt firewall. The firewalls are implemented as part of the hub 112 (se FIG. 1). The ioXt devices, such as the set-top box and camera are connected to the ioXt network 104 and firewall. The ioXt firewall also directs communications between devices. For example, a Proxied Follower (see FIG. 2), such as a light bulb, has no need for communication with devices such as a set-top box. The ioXt firewall can be configured to prohibit such unnecessary communications.

FIG. 6 also illustrates a motion sensor connected to a low power interface, such as a Zigbee interface. This illustrates two features of the ioXt system 100. In one feature, the motion sensor may be a legacy motion sensor that does not have the QR code or ioXt digital certificate discussed above. The ioXt system 100 may incorporate such legacy sensors, but those sensors operate on the Guest network 132 (see FIG. 1) and will not be granted access to the ioXt network 104. Although FIG. 6 illustrates a motion sensor as an example of a legacy device, those skilled in the art will appreciate that the same principles can apply to other legacy devices.

The motion sensor of FIG. 6 also illustrates the second feature of the system 100, which is the incorporation of an unknown device (e.g., the unknown device 140 of FIG. 1) into the ioXt network 104. As discussed above with respect to FIG. 1, the unknown device 140 initially connects to the Guest network 132 and the user scans the QR code with a software application program on a Submitter/Follower smartphone. The motion sensor can be connected to the secure ioXt network 104 upon verification, as described above.

FIG. 6 also illustrates components that can be provided by the cable service provider. The components in the dashed line at the top of FIG. 6 are provided by the cable network and cellular network as part of a security monitoring service. For example, the cable network may include a home security cloud server and a camera cloud server. The camera cloud server can record data from the camera in the home security network. The home security cloud server may also monitor other activities, such as motion sensors, temperature sensors, and the like, and provide security services. For example, if the home security cloud server detects a fire it can automatically contact the fire department or other emergency services.

The cable network illustrated in FIG. 6 also provides a gateway to miscellaneous cloud servers, which may include the WAN 102 (see FIG. 1). The cable network also provides a gateway to a cellular network, which may be the cellular network service provider for the mobile device illustrated in FIG. 6. The mobile device can contact the cable network via the cellular network to provide control mechanisms for the system 100. For example, the mobile device can remotely lock a door, turn on a light, activate a camera, or the like using the cellular and the cable network, as illustrated in FIG. 6.

Figure 7:
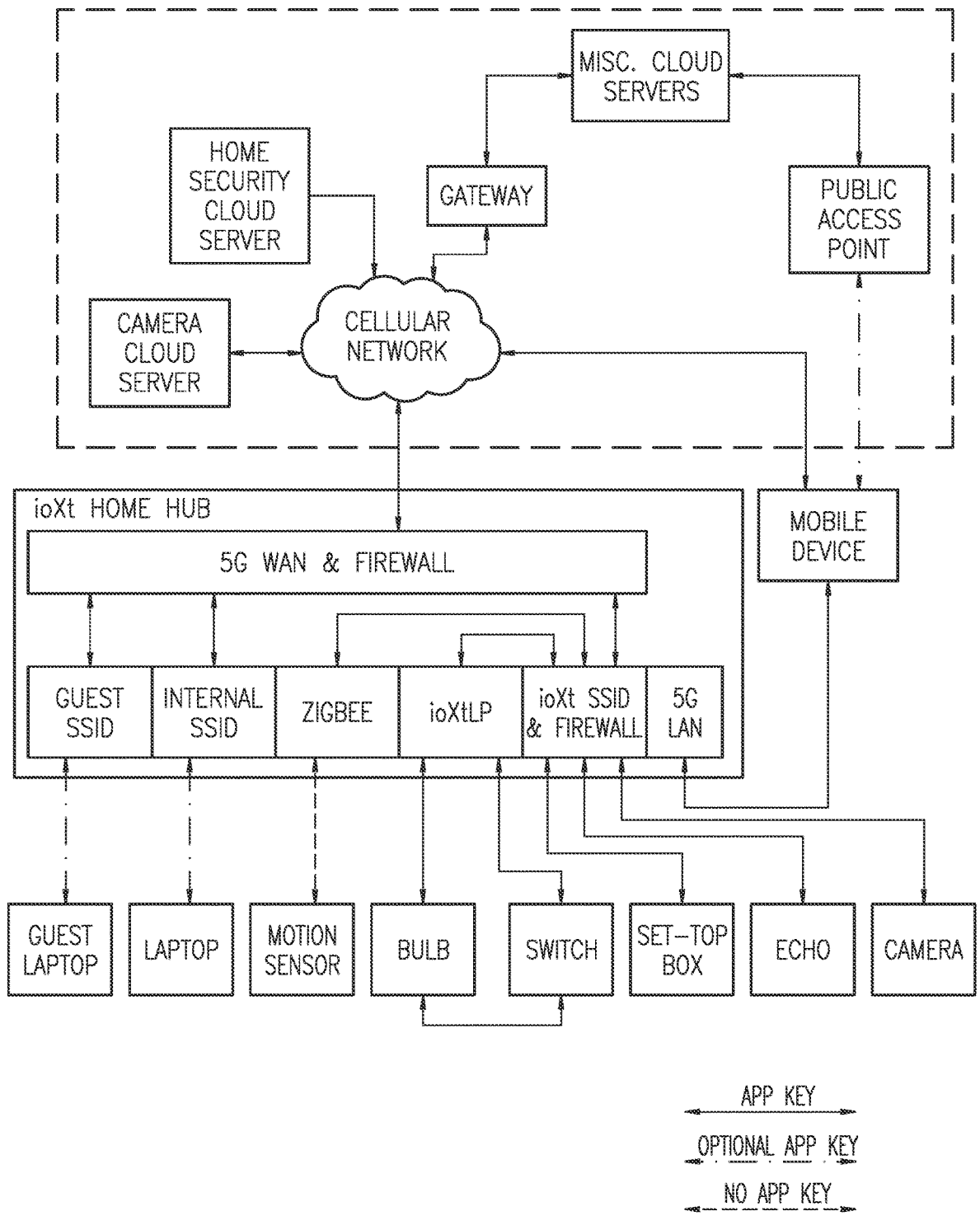
FIG. 7 illustrates a home security system, similar to that of FIG. 6, but implemented with a cellular network.

FIG. 7 illustrates a home security implementation using the techniques provided by an ioXt network, but implemented with a 5G cellular network in place of the cable network implementation illustrated in FIG. 6. The 5G implementation of FIG. 7 operates in a similar manner to the system of FIG. 6, but the WAN interface and firewall in the hub 112 are configured for operation with a 5G cellular network. Communication with the various Cloud networks can also be achieved using the 5G cellular network.

FIG. 7 illustrates the same devices, including the guest laptop, laptop, and motion sensor, discussed above with respect to FIG. 6. The operational feature of the 5G ioXt network is the same for these devices as discussed above. Similarly, the 5G ioXt firewall operates in the manner discussed above to control communications between devices and to prevent devices connected to the Guest network 132 from communicating with the ioXt network 104 or any devices connected to the ioXt network.

FIG. 7 also illustrates network components provided by the cellular network as part of a security monitoring service. In a fashion similar to that described above with respect to FIG. 6, the cellular network may provide a home security cloud server and camera cloud server that operate as described above with respect to FIG. 6. The cellular network also provides a gateway to miscellaneous cloud servers, such as the WAN 102 (see FIG. 1). The implementation of FIG. 7 is simplified in that the mobile device connects directly to the cellular network and is able to remotely monitor and/or control the system 100 via the cellular network. This eliminates the need to communicate with the cable network via the cellular network and thus eliminates the need for the gateways illustrated in FIG. 6.

Figure 8:
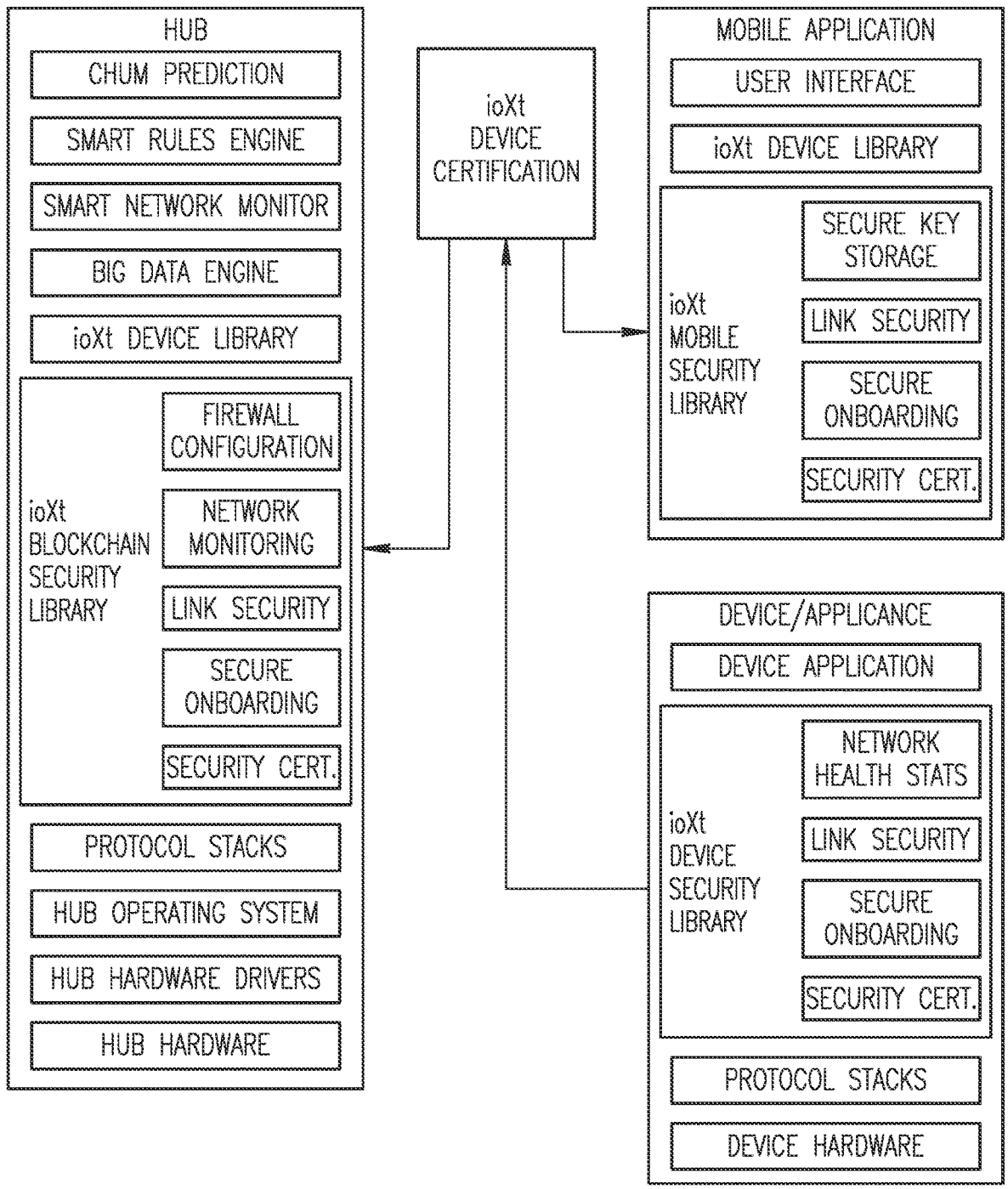
FIG. 8 illustrates the various system components used in the authentication/certification processes and in system operation.

FIG. 8 illustrates various system components used in the authentication and certification process and in system operation. Although FIG. 8 is not intended as a block diagram, it serves to illustrate the role of the ioXt device certification as it operates with the hub 112, an ioXt device (e.g., the ioXt device 120 in FIG. 1) and a user mobile application. For example, the smart rules engine can create or suggest rules for intercommunication between the various components, such as the ioXt devices 116-120 illustrated in FIG. 1. The smart network monitor in the hub 112 can monitor overall system operation to detect abnormal activity, such as may be indicated an infected device, device failure, failure of a communication link, or the like.

In another example, the big data engine monitors operation of the various devices and "learns" normal operation for the devices over time. Using this information the big data engine can identify changes in operation of a device that are abnormal. These abnormal operations can be an indicator of device failure or some form of system intrusion. In the event of system intrusion, the Leader hub may revoke the certification of the abnormal device to isolate it from the ioXt network 104 (see FIG. 1).

The ioXt device library contains the information regarding the ioXt devices coupled to the ioXt network 104. The ioXt blockchain security library illustrated in FIG. 8 contains the blockchain information described above, which includes firewall configuration, network monitoring, link security, secure onboarding of new devices, and security certificates. The mobile application and the ioXt device illustrated in FIG. 8 also include an ioXt security library.

FIG. 9 illustrates an ioXt Security Model. The security operations of the various portions of the ioXt system 100 are illustrated along with the security activities performed by each portion. For example, there are security activities at the cloud level, the on-premise level and at the device manufacturer level. At the cloud level, remote access is provided through the cellular network. The system 100 also provides a cloud to cloud access control list (ACL). This prevents one ioXt system from accessing information regarding another ioXt system.

At the on-premise level, security is provided in the form of network monitoring within the hub 112, as well as a hub enforced ACL. The ioXt devices also have an enforced ACL. This may include an encryption, the generation of end to end keys and a hub-managed key rotation. As previously discussed, the hub is a candidate device because of its trusted security level. The hub can generate network operational certificates and also maintains non-ioXt network segmentation. This separates the ioXt network 104 from the guest LAN 132.

Additional security may be provided through two-factor network inclusion and multi-party voting inclusion. For example, two-factor network inclusion may require a user to receive a text message on their mobile device and enter a PIN code within a limited period of time to provide final authorization to add a new device to the ioXt network 104. Similarly, the multi-party voting inclusion requires affirmative authorization from multiple parties before adding a new device to the ioXt network 104. This approach may be useful in a business setting where two or more people are required to approve the addition of a new device.

At the device manufacturer level, blockchain storage is provided for individual device models and protocol certification. The device manufacturer can also provide data related to expected traffic patterns. For example, a device such as a temperature sensor will communicate with the hub 112 (see FIG. 1) only intermittently and would not be expected to transmit large amounts of data during that period of transmission. The expected traffic patterns will allow the smart network monitor of FIG. 8 to detect abnormal activity in devices connected to the ioXt network 104. The device manufacturer also includes manufacturer certification, model certification, and device certification.

The device manufacturer provides over the air update information so that the ioXt devices may be updated, if necessary, to provide improved operation and/or security. The device manufacturer also includes anti-rollback modification to prevent a device from reverting to a previous software revision and thus disabling an OTA update.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should notbeconstrued to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A non-transitory computer-readable medium comprising computer instructions which, when executed by one or more processors, control authentication of an unknown device and connection of the unknown device to a secure network, comprising:
   a hub coupled to a secure local area network (LAN) and controlling operation of devices coupled to the secure LAN and controlling access to the secure LAN;

the hub initiating a connection process for the unknown device;

the hub receiving identification data related to the unknown device and providing data to the unknown device to thereby permit the unknown device to connect to an unsecure LAN, the unsecure LAN being communicatively coupled to a wide area network (WAN);

permitting the unknown device to communicate only with the WAN and the hub while connected to the unsecured LAN and prohibiting the unknown device from communicating with any devices coupled to the secure LAN;

the hub, upon connection of the unknown device to the unsecured LAN, receiving device credentials from the unknown device;

the hub validating the received credentials against data in a secure database;

the hub, upon verification of the credentials from the unknown device, certifying the unknown device as an identified device; and the hub establishing a secure session with the certified identified device to cause the transfer of connection from the unsecure LAN to the secure LAN so that the certified identified device leaves the unsecure LAN and joins the secure LAN.

2. The computer-readable medium of claim 1, further comprising the hub prohibiting the unknown device from connecting to the secure LAN when the credentials from the unknown device are not validated.

3. The computer-readable medium of claim 2, further comprising the hub permitting the unknown device to remain connected to the unsecure LAN, and to operate on the unsecure LAN, when the credentials from the unknown device are not verified.

4. The computer-readable medium of claim 1 wherein the identification data received by the hub comprises device identification information and manufacturer identification information for the unknown device.

5. The computer-readable medium of claim 1 wherein the unidentified device includes a QR code that causes the hub to initiate communications with the unidentified device.

6. The computer-readable medium claim 1 wherein the hub, upon connection of the unknown device to the unsecured network, generates a data log entry related to the unknown device.

7. The computer-readable medium of claim 6, further comprising a blockchain data storage wherein the data log entry generated by the hub is stored in the blockchain data storage.

8. The computer-readable medium claim 1 wherein the secure database provides device configuration data comprising network utilization patterns, device defaults, communication authorizations, and operational restrictions for the identified device upon verification of the credentials.

9. The computer-readable medium claim 1 wherein the credentials provided by the unknown device comprises a signed certificate.

10. The computer-readable medium claim 1 wherein the hub, upon verification of the credentials, provides a signed operational certificate to the identified device to permit the identified device to connect to the secure LAN.

11. The computer-readable medium claim 1 wherein the identified device generates an encryption key pair to request a certificate signing from the hub to permit the identified device to connect to the secure LAN.

12. The computer-readable medium claim 11 wherein the hub, in response to the request for a certificate signing from the identified device, provides a signed operational certificate to the identified device to permit the identified device to connect to the secure LAN.

13. The computer-readable medium claim 1, further comprising a blockchain data storage and the hub, upon verification of the credentials from the unknown device, generates a data log entry related to identification and acceptance of the unknown device for storage in the blockchain data storage.

14. The computer-readable medium claim 1 wherein a plurality of previously authenticated devices are coupled to the secure LAN, the hub generating an access control list for the identified device to thereby control access of the previously authenticated devices by the identified device.

15. The computer-readable medium claim 14 wherein the access control list for the identified device determines which of the previously authenticated devices can control the identified device and which of the previously authenticated devices can be controlled by the identified device.

* * * * *